Jan. 1, 1963   J. B. LAPPIN, JR   3,070,899
ABSORBENT DEVICE TO ABSORB GREASE FROM ARTICLES
Filed April 2, 1959   3 Sheets-Sheet 1

INVENTOR.
James B. Lappin, Jr.
BY Harold E. Cole
Attorney

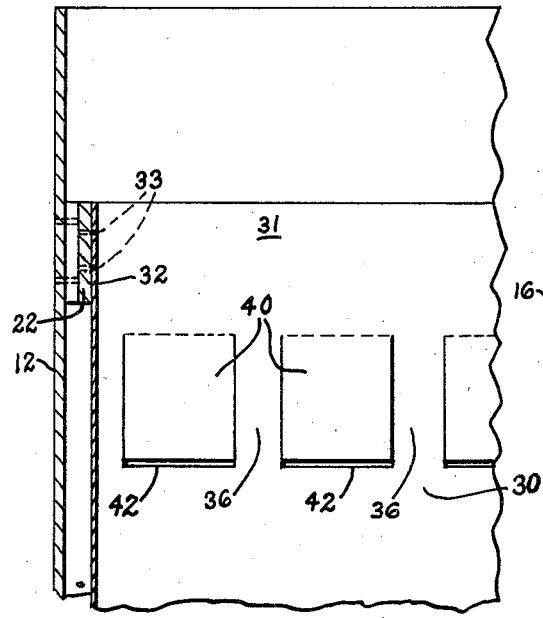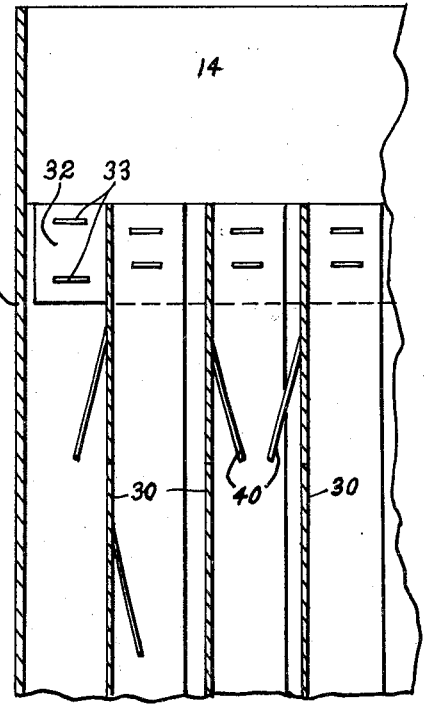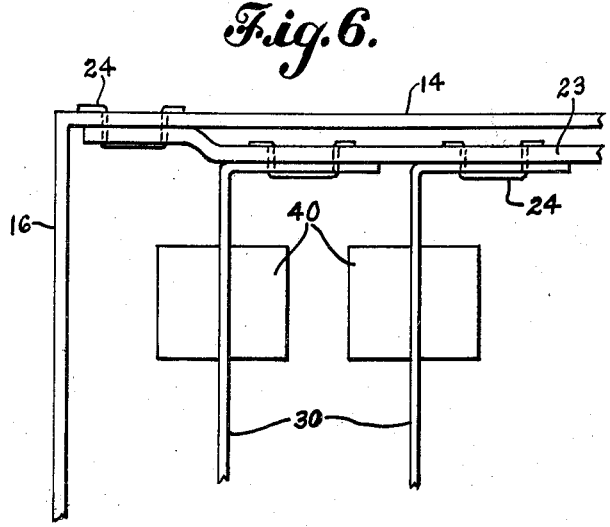

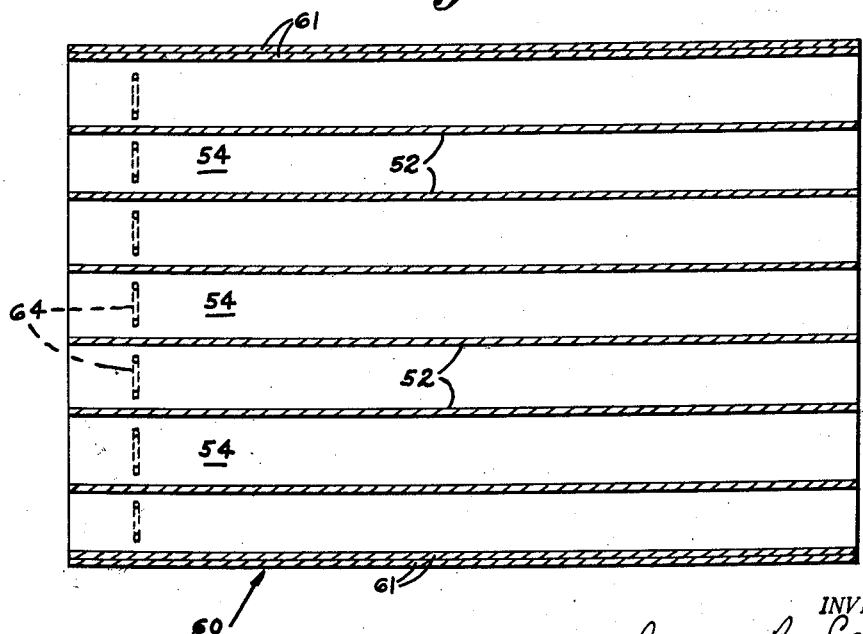

United States Patent Office 3,070,899
Patented Jan. 1, 1963

3,070,899
ABSORBENT DEVICE TO ABSORB GREASE
FROM ARTICLES
James B. Lappin, Jr., 3 Dean St., Belmont, Mass.
Filed Apr. 2, 1959, Ser. No. 803,648
3 Claims. (Cl. 34—95)

This invention relates to an absorbent device to absorb grease from articles, or remove other objectionable surface material from them.

Some articles, such as French fried potatoes, for instance, are cooked in grease and so much of it remains on the surface that they are undesirable as food for many persons. This is likewise true of other articles such as fried clams, scallops, as well as doughnut dough, in whatever shapes it is cooked, which carry on their surfaces undesirable amounts of grease.

One object of my invention is to provide an enclosure member or container with an absorbent means in it, that will contact the articles, and as they fall through the absorbing means or are shaken around in my device, grease on the articles is absorbed. Transferring the articles to the container is done while the grease thereon is in a liquid or soft state.

Another object is to provide the absorbing means with parts that make attachment to the enclosure member easy, so that the absorbing means will remain attached to the container even while being vigorously shaken.

A further object is to so form said absorbing means that it can be made of inexpensive material that satisfactorily serves the purpose, and which permits the use of mechanical equipment in forming the absorbing means and enclosure member.

A still further object is to make the outside enclosure member and absorbing means of a continuous sheet of absorbent material.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 4 is an enlarged sectional view taken on the line 4—4 of FIG. 3.

FIG. 5 is an enlarged sectional view taken on the line 5—5 of FIG. 3.

FIG. 6 is an enlarged, fragmentary top plan view of my absorbent device.

FIG. 7 is a top plan view of a modified form of my absorbent device.

FIG. 8 is a sectional view taken on the line 8—8 of FIG. 7.

Figure 1:
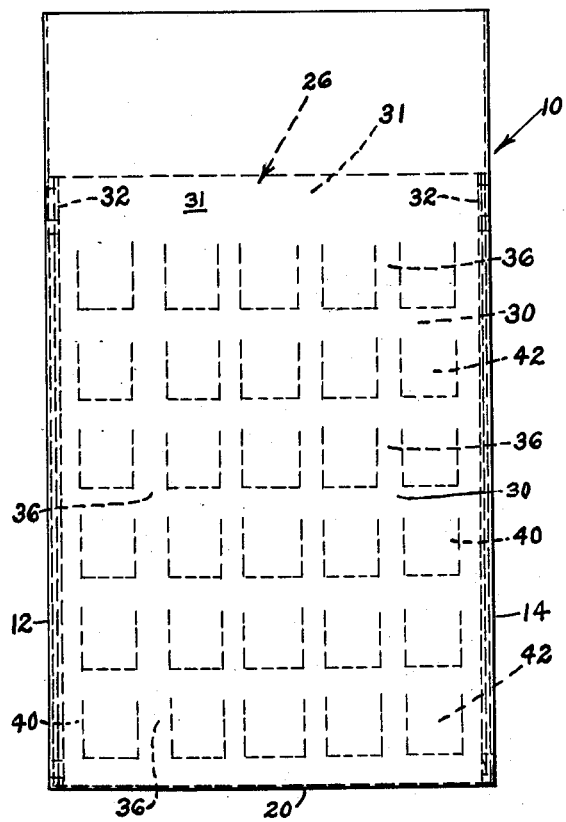
FIG. 1 is a front elevational view of my absorbent device.
Figure 2:
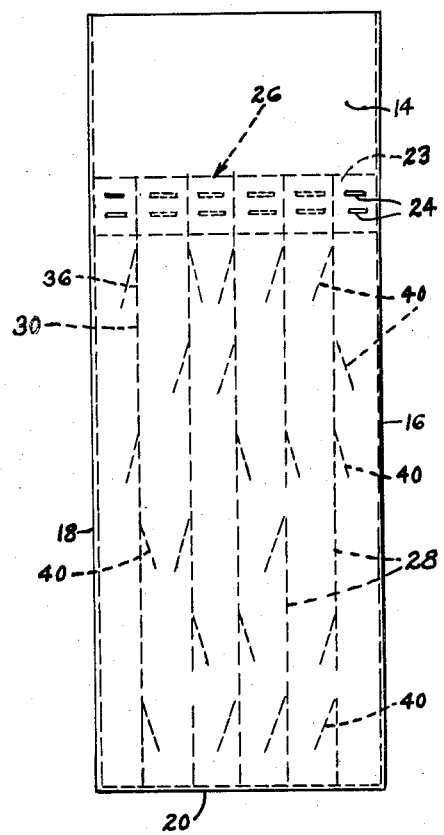
FIG. 2 is a side elevational view thereof.
Figure 3:
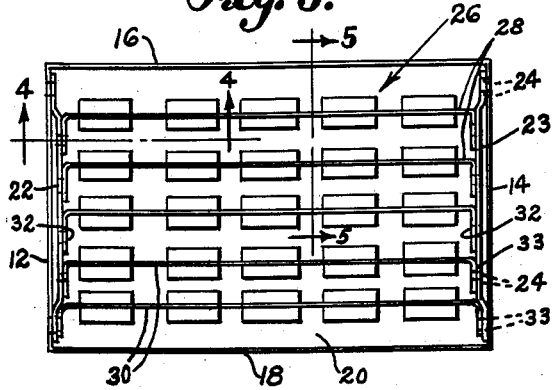
FIG. 3 is a top plan view thereof.

As illustrated, I provide an outside enclosure member or container 10 which may be a separate container such as an ordinary paper bag having, as shown, two sides or portions 12 and 14 opposite each other, and two other sides or portions 16 and 18 also opposite each other. A bottom 20 connected to said four sides, completes the container, in this instance, which latter is usually made of well known flexible, but fairly firm, paper.

At the upper portion of said container 10 are anchor members 22 and 23 which may be of the same material as said container and which are respectively attached to said opposite side portions 12 and 14 as by staples 24 or an adhesive.

An absorbent means 26, which may be formed in one piece, or several, is made of a soft paper, such as crepe paper, for instance, and preferably is well interspersed with openings, later described. It is attached to said container, as later explained. Articles, such as French fried potatoes, which are covered with considerable dripping grease, when hot, are dropped within said enclosure member or container 10 and the grease on them is absorbed by said absorbent means 26 as they pass through said openings or down the side of the container, or otherwise are brought into contact with my absorbent device. The bag may be shaken vigorously when all the articles are in it.

Said absorbent means 26 has several absorbent members 28 spaced laterally apart and extending laterally between said anchor portions 22 and 23, or directly to opposite side portions 12 and 14, to which they are connected. Each said absorbent member 28 has laterally extending parts or partitions 30 and 31 which preferably extend continuously across said container 10, and the principal portions of which are laterally spaced apart in normal position so greasy articles may pass between them.

Said laterally extending parts include upper parts 31 which are turned at right angles at their end portions 32 and there attached to said anchor members 22 and 23, as by stapling 33, as shown, or directly to said enclosure member 10. Only these upper parts 31, which preferably are solid, need be connected to said anchor portions or to said container 10, leaving the laterally extending parts 30 below them, free to move about somewhat within said container. However, if my device is especially large, a lower part made similar to part 31, may also be connected to said container. There are various well known ways of attaching said lateral parts 31 to said container such as cementing, taping and the like.

Said lateral members 30 and 31 are connected to one another by connector parts 36 that extend downwardly in said container 10, as shown in said FIG. 1, being relatively narrow, as shown. Between said connectors 36, and extending from said lateral parts 30 are flaps 40 which are integral with and opposite openings 42 in said parts 30, being cutouts at said openings, as shown. Since said flaps 40 are loose and flop around in use, said articles to be degreased may pass through said openings 42 in said absorbent means 26. In some instances, said flaps 40 may be omitted, leaving clear openings 42 in said lateral parts 30 between one said connector part 36 and another. The material forming said absorbent means 26 is preferably as soft or softer than that of said container in case a separate container is used.

Since the lateral spaces between said rows of lateral parts allow the greasy articles to pass unevenly downward in said absorbent means 26, degreasing commences instantly upon the articles entering said container and contacting said absorbent means.

In FIG. 7 of the drawings, a modified form of my device is shown in which a single sheet of material forms the container or enclosure member and the absorbent means.

Said sheet first forms the absorbent means 50 by extending the sheet from an angle portion 51 laterally to form a lateral member 52, similar to lateral member 30, at the end of which it is reversed and a fold 54 is formed, thus reversing the direction of said sheet and forming another lateral member 52 and another fold 56 at the opposite side extremity. All folds shown on the left side are numbered 54 and those at the right 56. These steps are repeated until there are sufficient lateral members 52 to provide the desired width.

Still continuing with said sheet it is extended outside the portions formed as aforesaid, to provide an outer enclosure member or container 60 that extends around said absorbent means 50 one or more times, and terminates at the end point shown as at 62.

Said fold portions 54 and 56 are attached to said outer or enclosure member 60 by staples 64 or by glue or other attaching means as is said angle portion 51 and parts of said lateral members adjacent said enclosure member 60.

While a bottom may also be provided for this outer enclosure member 60, it is possible to degrease the articles by holding this modified device closed at one end, or both ends, to prevent the articles passing out.

Said lateral members 52 may also be provided with openings and flaps and other parts as shown in said absorbent means 26.

What I claim is:

1. An absorbent device comprising an outside enclosure member embodying side portions, and absorbent means in said enclosure member embodying partitions extending laterally across said enclosure member, opposite sides of which partitions are attached to said enclosure member side portions, said partitions embodying portions of soft material intermediate said points of attachment and having openings therethrough and embodying flaps adjacent said openings.

2. An absorbent device comprising an outside enclosure member embodying side portions connected together, and absorbent means of absorbent material in said enclosure member embodying a plurality of rows of partitions extending laterally between opposite ends of said enclosure member, said partitions embodying upper parts extending laterally and having angularly extending end portions, means connecting said end portions to said enclosure member side portions that are opposite each other, laterally extending lower parts below said upper parts and spaced downwardly one from another, connecting parts extending downwardly from one said lateral part to another, said lower lateral parts having openings therethrough between said connecting parts, and flaps attached to said lower lateral parts and positioned opposite said openings.

3. An absorbent device comprising an outside enclosure member embodying bottom and side portions connected together, and absorbent means of absorbent material in said enclosure member embodying a plurality of rows of partitions extending laterally between opposite ends of said enclosure member, said partitions embodying upper parts extending laterally and having angularly extending end portions, means connecting said end portions to said enclosure member side portions that are opposite each other, laterally extending lower parts below said upper parts and spaced downwardly one from another, and connecting parts extending downwardly from one said lateral part to another, said lower lateral parts having openings therethrough between said connecting parts.

References Cited in the file of this patent

UNITED STATES PATENTS

| 586,642 | Vater | July 20, 1897 |
| 1,983,418 | Thurmer | Dec. 4, 1934 |

FOREIGN PATENTS

| 22,143 of 1913 | Great Britain | June 17, 1915 |
| 452,756 | Great Britain | Aug. 28, 1936 |
| 1,039,174 | France | May 13, 1953 |